United States Patent [19]

Massie et al.

[11] Patent Number: 5,436,018
[45] Date of Patent: *Jul. 25, 1995

[54] PREPARATION OF LOW CHOLESTEROL OIL

[75] Inventors: Cecil Massie, Bloomington, Minn.; Jeffrey B. Fine, Harrisburg, Pa.; Steven Marschner, Eden Prairie, Minn.

[73] Assignee: Source Food Technology, Inc., Burnsville, Md.

[*] Notice: The portion of the term of this patent subsequent to Feb. 26, 2008 has been disclaimed.

[21] Appl. No.: 886,266

[22] Filed: May 20, 1992

Related U.S. Application Data

[60] Continuation-in-part of Ser. No. 634,754, Dec. 27, 1990, abandoned, which is a division of Ser. No. 310,536, Feb. 13, 1989, Pat. No. 4,996,072, which is a continuation-in-part of Ser. No. 20,613, Mar. 2, 1987, Pat. No. 4,804,555, which is a continuation-in-part of Ser. No. 921,984, Oct. 21, 1986, abandoned.

[51] Int. Cl.$^6$ ............................................. A23D 9/00
[52] U.S. Cl. ...................................... 426/417; 554/15
[58] Field of Search ............... 426/417, 601, 607, 614, 426/330.1; 554/8, 15; 260/420, 428, 428.5

[56] References Cited

U.S. PATENT DOCUMENTS

| | | | |
|---|---|---|---|
| 3,717,474 | 2/1973 | Fioriti | 426/614 |
| 3,911,144 | 10/1975 | Strong | 426/330.1 |
| 3,941,892 | 3/1976 | Glasser | 426/585 |
| 4,804,555 | 2/1989 | Marschner | 426/601 |
| 4,971,827 | 11/1990 | Huang | 426/614 |
| 4,996,072 | 2/1991 | Marschner | 426/417 |
| 5,037,661 | 8/1991 | Merchant | 426/614 |
| 5,061,505 | 10/1991 | Cully | 426/614 |
| 5,063,070 | 11/1991 | Klemann | 426/330.1 |
| 5,064,668 | 11/1991 | Klemann | 426/330.1 |
| 5,091,203 | 2/1992 | Conte | 426/614 |

Primary Examiner—Carolyn Paden
Attorney, Agent, or Firm—Foley & Lardner

[57] ABSTRACT

A process for the continuous removal of cholesterol from a feed oil which comprises (a) wet milling a raw oil having an elevated cholesterol level with an extraction oil whereby there is formed a mixture of the raw oil and extraction oil; (b) centrifuging said mixture to yield a first fraction low in cholesterol, said first fraction being suited for incorporation into a foodstuff, and a second fraction which is an oil feed having a high level of cholesterol; (c) introducing said oil feed at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol; (d) and recycling said liquid phase as an extraction oil for said wet milling.

16 Claims, 2 Drawing Sheets

PREPARATION OF LOW CHOLESTEROL OIL

CROSS REFERENCE TO RELATED APPLICATIONS

This application is a continuation-in-part of application Ser. No. 634,754, filed Dec. 27, 1990, now abandoned which in turn is a division of Ser. No. 310,536, filed Feb. 13, 1989, now U.S. Pat. No. 4,996,072, granted Feb. 26, 1991, which in turn is a continuation-in-part of Ser. No. 20, 613, filed Mar. 2, 1987, now U.S. Pat. No. 4,804,555, which in turn is a continuation-in-part of now abandoned Ser. No. 921,984, filed Oct. 21, 1986.

This application incorporates by reference the entire text of the aforementioned U.S. Pat. No. 4,996,072, granted Feb. 26, 1991, "Physical Process for the Deodorization and/or Cholesterol Reduction of Fats and Oils" including the entire specification and all drawings.

BACKGROUND OF THE INVENTION

1. Technical Field

The present invention relates to food products. More particularly, the present invention relates to methods for treating fats and oils especially fish oils and dairy fats and oils, for deodorization and/or cholesterol level reduction. In its product aspect, the present invention relates to edible fats and oils, especially fish oils and dairy fats and oils, characterized in part by bland flavor and reduced cholesterol level.

2a. Background Relevant to the First Aspect of the Invention

The first aspect of the invention is the original, first and joint invention of Steven S. Marschner, Minneapolis, Minn. and Jeffrey B. Fine, Harrisburg, Pa. as defined by claims 1–8. The state of the art relevant to the first aspect of the invention relates to the state of the art as of the invention date for the ultimate parent application.

A great deal of attention has been given to the various health benefits apparently associated with the consumption of fatty fish. The health benefits appear to be related to the presence of high levels of the n-3 family of polyunsaturated fatty acids. Oils containing these fatty acids, such as fish oils, are referred to as "omega-3" oils and desirably contain high levels of n-3 fatty acids, especially eicosapentaenoic acid ("EPA") and docosahexaenoic acid ("DHA").

Notwithstanding the present interest, non hydrogenated fish oil, generally, to date has not been used widely in food products due to problems in odor, flavor and especially stability, primarily oxidative rancidity. Also, fish oil undesirably contains cholesterol. However, canned salmon has had added salmon oil. Also, certain canned meat products have been marketed in Japan which have had refined fish oil added as a nutritional supplement.

Hydrogenated fish oils are much more stable due to the decrease in the degree of polyunsaturation and are widely used in Europe for margarine. Hydrogenation is also effective in reducing odor and off-flavor development after deodorization. However, hydrogenation by decreasing polyunsaturation, including the n-3 fatty acid content, correspondingly decreases the health value of fish oil.

The present invention in its broad aspect relates to a physical method for reducing the cholesterol level of, and/or deodorizing fats and oils, which are referred to herein as an "oil feed". By the term "oil feed" it is recognized that any oil may be used provided it has a relatively high cholesterol level that is advantageously lowered. For example, a vegetable or animal oil may be comprised in an oil feed, as may a centrifugation product rich in cholesterol. For fish oil in which high levels of undesirable odor and cholesterol, are problems, the present invention involves the simultaneous reduction of cholesterol level and deodorization. For dairy and various other fats and oils which have high native cholesterol levels, but which do not have particular other problems, the focus of the present invention is directed principally to the reduction in cholesterol level. Reducing the cholesterol content of a fat or oil is also nutritionally important since reducing cholesterol intake can reduce serum cholesterol, and reducing serum cholesterol has been shown to lower the risk of heart disease. Chemical extractant methods for cholesterol removal or reduction in oils are known. Chemical methods are too expensive, however, for commercial scale use. Also, chemical extraction undesirably results in the production of oils contaminated by residual amounts of chemical extractants. While several chemical methods for removing cholesterol are known, the only physical method believed known in the art is molecular distillation.

Molecular distillation for cholesterol reduction, however, requires extreme operating conditions including a pressure in the micron range. While molecular distillation is effective for removing some but not all cholesterol, the process can yield a fish oil with undesirable darkening of oil color and an undesirable strong "chemical" flavor. The dark color and off-flavor are due to the presence of odoriferous materials which remain after or are formed during molecular distillation. Thus, with respect to fish oils, molecular distillation still requires subsequent deodorization. The two processes cannot be combined since the vacuum conditions which define molecular distillation preclude the addition of steam which strips off these odoriferous materials. Additionally, commercial scale molecular distillation equipment is very costly. Most importantly from a cost standpoint, another major disadvantage of molecular distillation is the significant product loss which is associated with the "distillate" fraction. In molecular distillation the distillate fraction can run from 7% to as high as 20% or higher in order to achieve cholesterol reduction comparable to the results of the present invention. Since the distillate fraction is unusable due to its containing the undesirable constituents in concentrated form, such high distillate fractions reduce overall yields. Reduced yields is a most significant cost factor due to the high cost of the starting material in addition to the high cost of molecular distillation itself.

In accordance with the present invention, another physical method has been discovered for removing substantially all of the free or "non-esterified" cholesterol from fats and oils whereby the overall cholesterol level is reduced and many of the disadvantages of molecular distillation are overcome. In the principal operative step of the present invention, the operating conditions utilize a much higher pressure than employed in molecular distillation, so as to maintain steam during stripping. Surprisingly, these conditions are nonetheless effective for cholesterol removal. Furthermore, the equipment needed to practice the method is commercially available on a commercial scale, is less expensive compared to molecular distillation equipment, and is much less expensive to operate. More importantly, the distillate fraction is as low as 1% compared to the 20% for molecular distillation.

Deodorization of oils by steam stripping is commonly the finishing step in edible oil processing, including those processes involving molecular distillation such as to reduce cholesterol. The typical equipment employed contains set stations which sparge steam into a body of oil with high baffeling. Conventional deodorization can remove some sterol materials, but such reduction is very modest. For example, see Neal, U.S. Pat. No. 2,351,832, where relatively low levels of sterols are removed, and the broadest claim by Neal for removal limits the possibility for removal to a maximum of sixty percent. In addition to reducing cholesterol level, another surprising benefit of the present invention that the present process deodorizes the fish oil simultaneously with cholesterol level reduction without substantial destruction of desirable n-3 fatty acids. Thus, a further surprising advantage of the present invention is that the conventional oil finishing deodorization step is made optional rather than mandatory for the realization of clean fish oils. In certain embodiments of the present invention a deodorization step may still be desirable, such as when cleaned fish oils of highest possible purity and quality are desired.

2a. Background Relevant to the Second Aspect of the Invention

The second aspect of the invention is the original, first and sole invention of Cecil Massie, Bloomington, Minn., as defined by claims 9–18. The state of the art relevant to the second aspect of the invention comprises prior art applicable as of the instant invention and filing dates.

For purposes of the second aspect of the invention, the prior art comprises Marschner & Fine, U.S. Pat. No. 4,996,072, granted Feb. 26, 1991. Applicants also lay no claim to recycling, per se, and acknowledge prior art such as Bracco et al., U.S. Pat. No. 4,333,959, "Decholesterization of Egg Yolk" which discloses colloidal mixing of an oil to be treated and a recycle oil. Such known techniques in the prior art with colloidal mixing are not a part of the present invention.

SUMMARY OF THE INVENTION

In accordance with a first aspect of the invention there is provided a method for reducing the cholesterol level of an oil feed comprising introducing an oil feed having an elevated cholesterol level in comparison to a desired cholesterol level at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol. The countercurrent thin-film steam stripper should be internally provided with sufficient evaporative effective surface area such that said countercurrent thin-film steam stripper is capable of removing at least 65% of the cholesterol from a cholesterol-containing oil. Thus, said countercurrent thin film steam stripper is internally configured with sufficient active surface area so that it is capable under appropriate operating flow conditions of temperature, pressure and steam flow rates to remove at least 65% cholesterol from a cholesterol containing oil. In different words, the apparatus used in accordance with the invention has a greatly enlarged number of theoretical plates as distinguished from the simple use of an "unpacked" apparatus, i.e., one without a high number of theoretical plates when applied to cholesterol reduction. Accordingly, it is understood that "capable of removing at least 65% of the cholesterol from a cholesterol-containing oil" refers to the ability of the system used in accordance with the invention to eliminate a large amount of cholesterol. It is to be understood that even if the system of the present invention is used, one skilled in the art could still find ways to circumvent the advantageous results, for example, by passing a large volume of feed oil through the system with a de minimis residence time in the system. In such a case, the user would repeat the process several times or end up with less than an optimum reduction of cholesterol. In accordance with a preferred embodiment, the method is operated under conditions to remove at least fifty percent of the cholesterol from said oil feed. In a further preferred embodiment, at least 65% of the cholesterol is in fact removed from said feed oil.

Any oil may be used as the oil feed in the practice of the invention, including oils that are mixed with vegetable oils. In a preferred embodiment, the feed oil is a fish oil, animal fat or oil, marine fat or oil, dairy fat or oil. In another embodiment, the feed oil is a dairy fat or oil. In yet another embodiment, said feed oil is a dairy fat or oil which is anhydrous butterfat. And, in a still further embodiment, the feed oil is an animal fat.

The thin-film stripper of the present invention should be maintained at a temperature of at least about 400° F., preferably using an internal circulation of auxiliary heating media through the stripper's plumbing to provide further indirect heating of the oil for process control. Distinguishing the present invention from previous thin-film strippers is not only the use of a cholesterol-containing oil, but also the arrangement of the apparatus to provide for a sufficient effective evaporative surface to permit a high level of the cholesterol to be removed. Thus, the stripper as used in the prior art is commonly referred to as a tube and disc type evaporator. Generally in the prior art this type of equipment is used for different purposes, namely solvent recovery, e.g., hexane removal from soybean oil, and thus typical industrial focus has been given to optimization of the distillate fraction. The thin-film stripper may, for example, be arranged to have a larger interior surface area and thereby to greatly increase the evaporative surface area in comparison with the conventional use of otherwise identical equipment. The arrangement used in accordance with the present invention provides for the number of theoretical plates to be dramatically increased and thus mass transfer rates increased so as to effect removal of the non-esterified cholesterol notwithstanding any similarities between the operating conditions and residence times of conventional steam stripping deodorization and the present method.

In accordance with a second aspect of the invention there is provided a process for the continuous removal of cholesterol from a feed oil which comprises (a) wet milling a raw oil having an elevated cholesterol level with an extraction oil whereby there is formed a mixture of the raw oil and extraction oil; (b) centrifuging said mixture to yield a first fraction low in cholesterol, said first fraction being suited for incorporation into a foodstuff, and a second fraction which is an oil feed having a high level of cholesterol; (c) introducing said oil feed at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol; (d) and recycling said liquid phase as an extraction oil for said wet milling.

In step (a) of wet milling a raw oil having an elevated cholesterol level with an extraction oil whereby there is formed a mixture of the raw oil and extraction oil, the amount of raw oil yolk versus the amount of extraction oil, whether recycled or freshly introduced, is from about one to about four parts by weight of extraction oil per part raw egg oil, and more preferably about two parts extraction oil per part raw egg oil.

The wet milling of the present invention involves mixing the ingredients in a high intensity mixer of the type that can be used for making mayonnaise. In a preferred embodiment there may be mentioned a wet milling apparatus sold under the trademark, Fryma VK-7 (Fryma-Maschinen AG, CH-4310 Rheinfelden, Switzerland).

The extraction oil that enters the wet milling process at the commencement of any production run may be either leftover extraction oil from a previous run, extraction oil that has been recycled, fresh oil, or any combination thereof. When a fresh oil is introduced into the procedure, the oil may be of animal or vegetable origin. As examples of oils that may be used as the extraction oil may be mentioned vegetable and animal oils. As vegetable oils may be mentioned soy oil, corn oil and safflower oil. As animal oils may be mentioned lard, tallow, chicken fat or a marine oil, e.g., a fish oil. In a preferred embodiment chicken fat is used as the extraction oil.

The temperature of step (a) is not particularly critical. It is recognized that the extraction oil that is recovered in step (c) is at a temperature of at least about 400° F. when it exits the steam stripper. Preferably, the oil is permitted to cool, for example, to room temperature, but it is may be used without such cooling, preferably at a temperature of up to about 100° F.

It is contemplated in a preferred embodiment that wet egg yolk, separated from the egg white, is the raw oil to be used in the invention. It is particularly advantageous to treat the egg yolk as it is notoriously high in cholesterol which is a major drawback to the wider usage of this otherwise wholesome food.

In step (b) centrifuging said mixture to yield a first fraction low in cholesterol, the first fraction is suitable for incorporation into a foodstuff. Where wet egg yolk is used as the raw oil in step (a), in a preferred embodiment the first fraction is a low cholesterol egg yolk product which is then suitable for use, as such, or for mixing with egg white, either for sale as a whole egg product to commercial food processors or for retail sale to homemakers.

In the centrifugation step (b), in one embodiment a batch centrifugation may be used where a simple test tube is centrifuged for a period of five minutes, during which two discrete phases are reached. An extraction oil phase is decanted off and used in step (c). The remaining egg yolk is then suitable for further processing as a foodstuff. In a second embodiment, a continuous centrifugation process is used which is more suitable for a commercial operation.

Through the centrifugation process there is a substantially complete separation of the cholesterol from the egg yolk. The cholesterol is uniformly distributed in the oil phase that is decanted off, thereby permitting an optimum removal of cholesterol.

The second fraction from step (b) that is decanted off in the centrifugation process is a cholesterol rich oil that is preferably recycled by first treating that fraction under the procedures of step (c). Step (c) duplicates the procedures of the first aspect of the invention, i.e., it comprises introducing said oil feed at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol.

The vapor phase is rich in cholesterol. It is either discarded or may be retained for recovery of the cholesterol.

The step (d) comprising the recycling of the liquid phase returns the remaining oil for use in step (a).

In accordance with the second aspect of the invention there is provided an egg substitute that comprises (a) egg yolk that contains substantially no cholesterol; (b) an oil substantially free from cholesterol in an amount at least about equal to the amount of cholesterol in a raw egg; and (c) egg white, in an amount substantially equal to the amount of egg white per egg yolk in a native egg. In a preferred embodiment, the oil component (b) is a substantially cholesterol-free oil derived from chicken fat.

UNITS OF MEASUREMENT

Throughout the specification and claims, percentages and ratios are by weight and temperatures in degrees Fahrenheit unless otherwise indicated.

DETAILED DESCRIPTION OF THE INVENTION

In a preferred embodiment of the first aspect of the invention, the present invention relates to physical processes for the deodorization and/or reduction in the cholesterol levels of fats and oils, and particularly, dairy fats and oils and freshly refined or reverted fish oils.

In a preferred embodiment of the process dealing with fish oil, the fish oil is first deaerated to an oxygen level of less than about 0.1% dissolved oxygen (by volume). The deaeration step involves subjecting the fish oil to a vacuum with or without sparging an inert gas through the oil. Thereafter, about 1 to 15%, preferably 2 to 5% by weight of steam is added to the fish oil while under vacuum at a pressure of at least 1 mmHG absolute, typically 1–7 mmHg and the mixture heated to at least about 400° F., and preferably up to 550° F., still more preferably 430° to 500° F., most preferably 460° to 480° F. In an optional embodiment of the invention, the mixture is flash vaporized by introduction into a zone such as a disengaging or flash chamber having a pressure of at least about 1 mmHg, preferably 1–7 mmHg, to form a loaded steam vapor phase and a par-treated fish oil phase. The par-treated fish oil is thin-film stripped with 1 to 15%, preferably 2 to 5% by weight countercurrent steam at least 1 mmHg, and preferably up to 7 mmHg, to provide a clean fish oil of reduced cholesterol content. The cleaned fish oil is cooled under vacuum, optionally with sparge steam, then anaerobically stored.

The present invention provides fish and dairy fat and oil products essentially characterized in part by substantially complete removal of non-esterified cholesterol whereby the overall cholesterol levels are reduced. Such oils are characterized by only modest changes in fatty acid profiles in general and in particular the retention of high levels of n 3 fatty acids. With respect to fish oils, the products are also characterized by the bland flavor of clean fish oil while retaining high levels of n 3 fatty acids. The combined total n-3 fatty acid content of the processed fish oils, especially EPA plus DHA, is at least about 95% of the level of the starting material.

In its process aspect, the present invention relates to economical, physical processes for the reduction of cholesterol level and/or the deodorization of fats and oils, and particularly fish oils and dairy fats and oils. In its product aspect, the present invention relates to processed fats and oils of reduced cholesterol levels but substantially free of residual organic solvents or chemical extractants. For fish oils, the product is also bland in flavor, but nonetheless high in EPA and DHA. Importantly, the present invention includes, inter alia, the step of thin-film steam stripping preferably with high steam consumption rates. Each of the process steps as well as product use are described in detail below.

Fish oil(s) have long been a staple of commerce in this country and their description as well as extraction and conventional processing and use are well described in "Fish Oils" edited by M. E. Stansby, Avi Publishing Co., Inc., Westport, Conn. (1967). Especially useful for their therapeutic value herein are oils having a total n-3 fatty acid content of greater than about 20% such as menhaden oil, herring, capelin, anchovy, cod liver, salmon oil and sardine oil. The up-stream processing of fish oils to produce the present starting materials is similar to that of vegetable oils. Typically, the processing can comprise conventional refining bleaching, deodorization, and optionally winterizing and degumming. Conventional hydrogenation, however, is to be avoided. Typically, however, deodorization of an oil is the very last step in oil processing. The fish oil so prepared is referred to herein as "refined" fish oil and thus refers to undeodorized fish oil which has been refined, bleached, and optionally degummed and/or winterized. For dairy and various fats and oils, however, prior refinement is not essential and thus, in many cases, can be eliminated.

Useful herein as the starting material are both freshly refined fish oil and reverted fish oil. By the term "reverted fish oil" is meant fish oil which has been previously refined and deodorized but which has subsequently undergone degradation by the passage of time and/or exposure to oxygen and thus has reverted back to an unpalatable state. Of course, other fats and oils with high non-esterified or free cholesterol levels can also be processed successfully including, by way of example, (1) dairy fats and oils such as butter oil, (2) animal fats and lard, especially lard and chicken fat, and (3) marine fats. The treatment of these fats and oils is also contemplated as within the scope of the present invention. It is to be appreciated that the present invention finds particular suitability for use in treating fish oil and throughout the specification other oils are contemplated even though fish oil is specifically described however, minor changes in processing conditions may be necessary in order to achieve optimum results when specific other oils are being treated.

No attempt is made herein to distinguish between "fats" and "oils" as is sometimes made in the art since at the operating conditions of the present invention, the fatty triglyceride materials being processed are in a fluid state whether or not they exist in that physical form at room temperature.

In accordance with the preferred process, the starting fish oil whether freshly refined, reverted or mixtures thereof is characterized by an initial or native cholesterol level. The exact cholesterol level varies depending upon such factors as fish species, seasonality, geographical catch location and the like. Generally, however, such cholesterol levels can range from about 350 to 700 mg/100 gm of fish oil.

The starting fish oil is desirably first deaerated in conventional manner. (See for example, U.S. Pat. No. 3,506,696 issued Aug. 14, 1970 to Baker et al. and is incorporated herein by reference.) Deaerating the oil can be accomplished by subjecting the oil to a partial vacuum and/or by sparging an inert gas, e.g., nitrogen through the oil. For example, initially, a pressure of about 25 mmHg is maintained for about 5 to 15 minutes. Thereafter, a modest nitrogen sparge can be continued for about 5 to 10 minutes. The particular technique or conditions employed are not critical so long as after dearation the total dissolved oxygen is less than about 0.1% by volume, preferably less than about 0.05%, prior to subsequent processing in order to prevent oxidation of the oil by dissolved oxygen.

As discussed above, the deaeration step is of less importance with dairy fats and oils as well as other possible oils and may thus be eliminated for those. For dairy fats and oils, the starting oil is preferably anhydrous butterfat.

Figure 1:
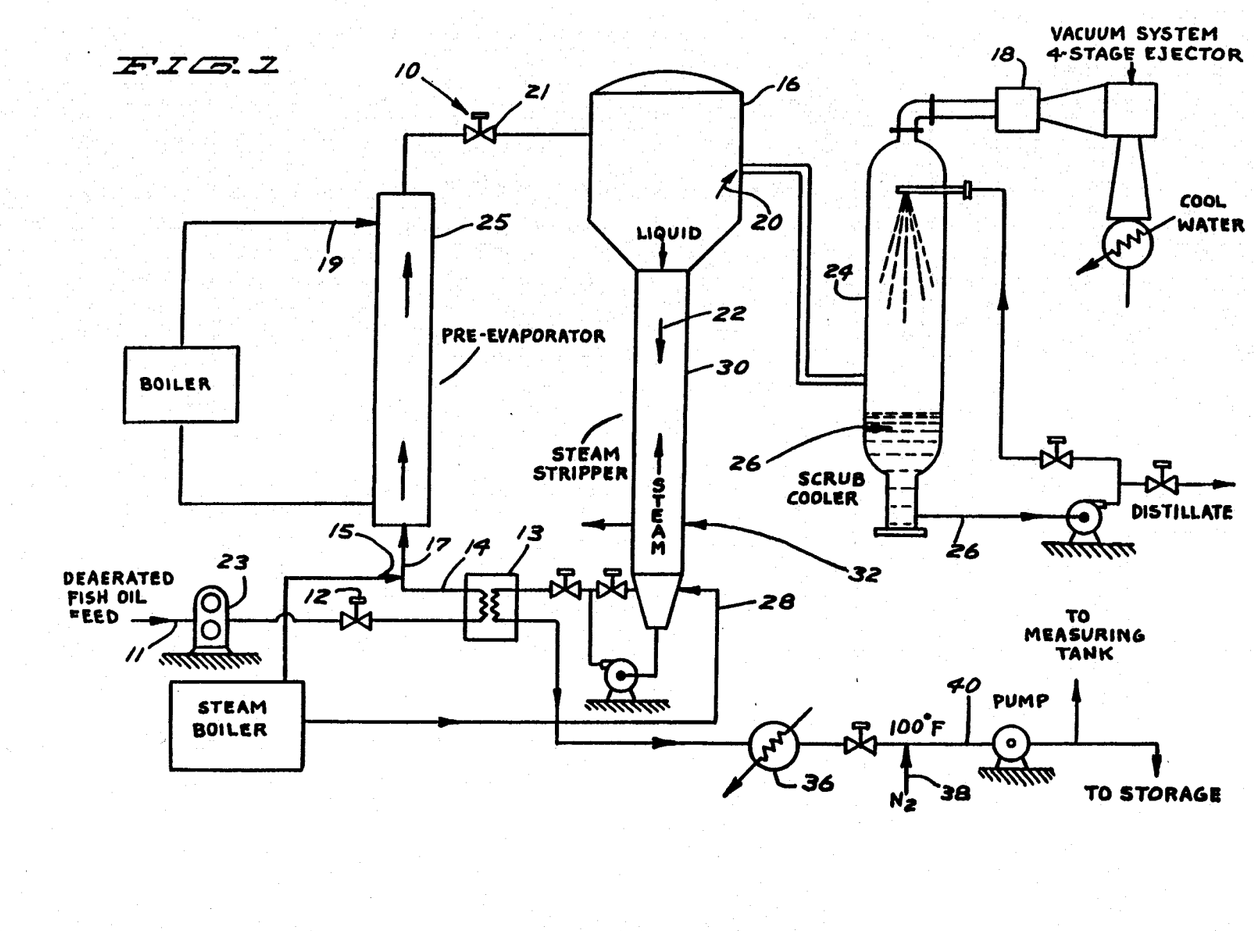
FIGS. 1 and IA are as set forth in the aforementioned and incorporated by reference text of U.S. Pat. No. 4,996,072 and comprise a schematic flow chart diagram of one embodiment of the first aspect of the present invention.
Figure 2A:
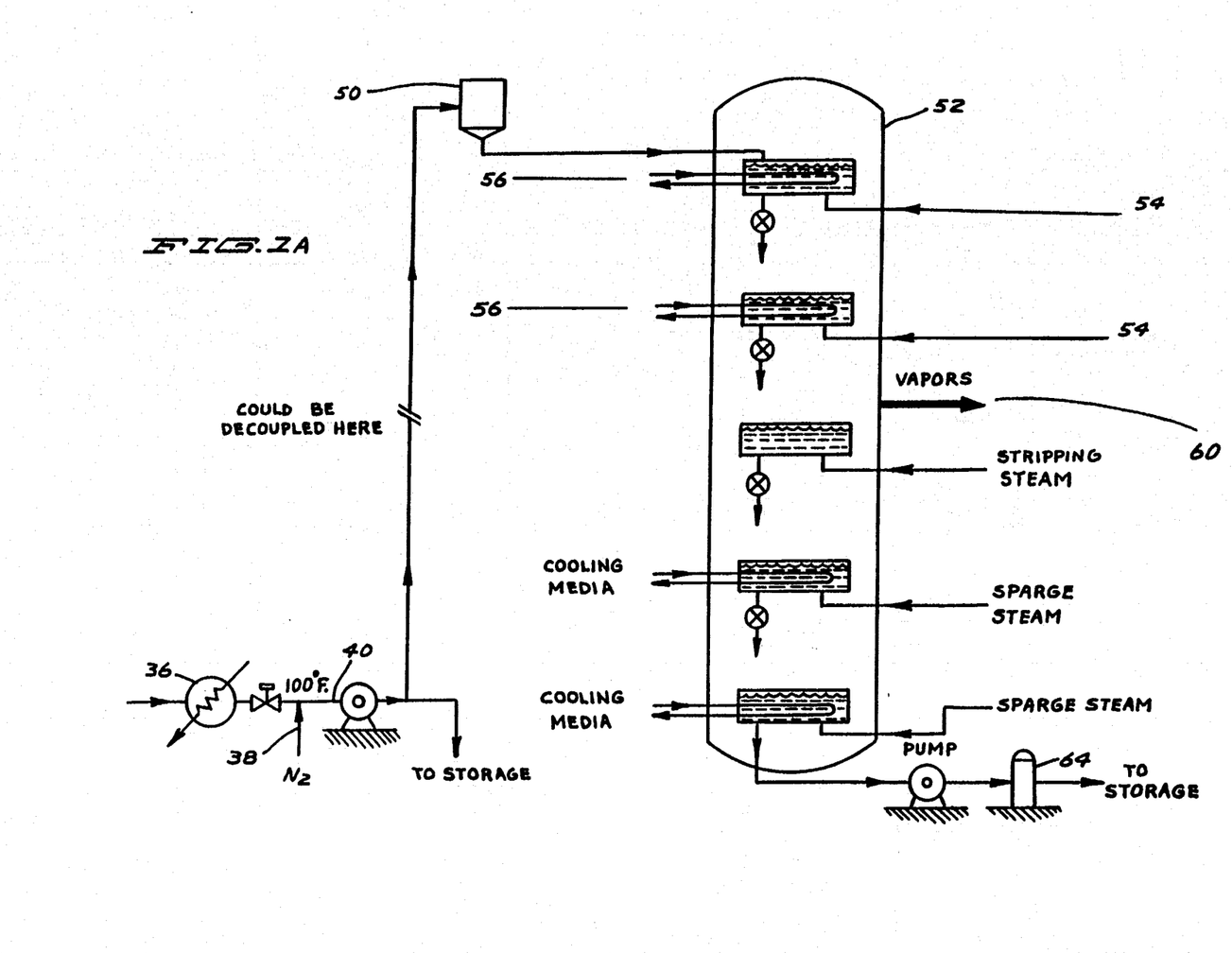

Now referring to FIG. 1 of the aforementioned and incorporated by reference text of U.S. Pat. No. 4,996,072, there is shown an embodiment of the present process designated generally by reference numeral 10.

A deaerated fish oil feed 11 is pumped by pump 23 so as to pass through a back pressure valve 12 which maintains the entire system at a pressure of at least 1 mmgHg, preferably 1-7 mmHg, which is provided by any conventional vacuum means 18 such as a steam jet system, e.g., four-stage. Optionally, the fish oil 11 may be modestly preheated such as with a first heating means 13 such as a plate heat exchanger so as to provide a preheated fish oil 14. Then the deaerated fish oil 14 is, in a highly preferred embodiment, mixed under vacuum with a first steam feed 15, either wet or dry but preferably dry to form a steam/oil mixture 17. While cholesterol removal can be accomplished without using the first steam feed 15, better removal of odoriferous constituents is achieved when steam is admixed with the oil feed and there is a corresponding improvement in stability of the finished fish oil. It is believed that when processing dairy fats and oils, where reduction of cholesterol is the principal concern, the steam feed can be eliminated. In such case, the oil is heated, without steam, to a temperature of at least about 400° F., and preferably 400° to 500° F.

The fish oil and steam mixture 17 can then be heated with a second indirect heat means 25 such as in a rising-film pre-evaporator using a heat transfer media 19 such as Dowtherm A to raise the temperature of the mixture 17 to essentially at least about 400° F., and preferably about 400° to 550° F., preferably 430° to 500° F., most preferably about 460° to 480° F. Such indirect heating is the preferred method for heating the steam/oil mixture 17 although other techniques, e.g., further steam addition can also be used. Generally, steam consumption rates, if indirect heating is employed, run for this admixture 17 from about 0.1 to 15 lbs. of steam per 100 lbs. of fish oil, preferably about 1 to 5 lbs./100 lbs.

Conventional equipment can be used for such mixing and heating, such as simply sparging the steam 15 in line. The first steam feed's 15 condition or steam quality is not critical since thereafter the fish oil/steam mixture 17 is to be heated to the prescribed temperature range with the indirect heating being employed. Of course, the higher the steam enthalpy, the less indirect heating will be required.

Thereafter, the oil and steam mixture 17 passes optionally through means for controlling the oil feed rate 21 such as an ordinary throttling valve and is introduced to a zone or headspace 16 of relatively lower pressure to flash vaporize the steam and to flash off a portion of the cholesterol and odoriferous constituents in the oil to produce a loaded steam vapor 20 in the vapor headspace 16 and a par-treated fish oil 22. The loaded steam vapor 20 is pulled to a means for collecting the vapor 24 such as a conventional condenser or scrubber and a distillate 26 formed thereby collected for disposal and which contains the odoriferous constituents and cholesterol in highly concentrated form.

The downwardly falling par-treated fish oil 22 is then essentially very thin-film steam stripped with a second, countercurrent steam feed 28, such as by using steam stripper 30. It is important during the practice of this step to maintain the pressure in the stripper 30 at about at least 1 mmHg, preferably about 2-3 mmHg. The temperature of the fish oil is essentially maintained at a temperature of at least about 400° F., and preferably about 400° to 550° F., more preferably 430° to 500° F., most preferably 450° to 470° F., such as by controlling the oil feed rate, and/or the temperature of the heat transfer media e.g., Dowtherm A or Therminol 66 and/or the amount of stripping steam 28. The stripping steam rate is maintained at 1 to 15%, preferably 2 to 5%.

Equipment useful for the practicing of both the flash vaporization step and the thin film steam stripping step and thus combine both the vapor head 16 and stripper 30 are available commercially from Artisan Industries, Inc. The equipment and operation are described in U.S. Pat. Nos. 3,198,241 (issued Aug. 3, 1965 to J. L. Baird); 3,393,133 (issued Jul. 16, 1968 to J. L. Baird) and 3,620,283 (issued Nov. 16, 1971 to Brown et al.) each of which are incorporated by reference. Generally, these patents are directed to apparatus and methods of fluid material treatment wherein liquid material to be stripped is cascaded over an alternating series of tubular jackets and discs, yielding a continual disruption of the film on the internal surface of the tube jacket in the vertical fall path after relatively short vertical distances and in which heat is supplied primarily to the continuous vertically moving, relatively thin liquid film phase. In this manner heat is conserved, hot and dry spots on the disc surface are prevented, and the ease and efficiency of handling heat-sensitive materials is enhanced. The placing of the heat exchange fluid in an indirect heat exchange relationship primarily with the thin-film phase of the internal side of the tube permits the more efficient concentration and evaporation of materials.

The stripper 30 is commonly referred to as a tube and disc type evaporator. Generally, this type of equipment is used for different purposes, namely solvent recovery, e.g., hexane removal from soybean oil. It is highly surprising to select such equipment for use herein and such selection goes against the strongly held beliefs in the art with respect to the utility of such equipment for use as contemplated herein. Moreover, the equipment is used herein in an unconventional manner to achieve the present advantages. A first difference in using the equipment in the present invention is in the utilization of steam in admixture with the oil feed in the pre-evaporator, prior to the vapor head zone in preferred embodiments. Typically, oil and solvent mixtures are fed to the vapor head rather than steam and oil mixtures. Other differences are noted below in operating techniques.

The stripping steam feed 28 is preferably introduced at the bottom of the steam-stripper 30 so as to countercurrently contact the par-treated fish oil which is introduced into the top of the apparatus 30. The present thin-film steam stripping step is further importantly characterized by the steam consumption rate which can range from about 1 to 15, preferably about 2 to 5 lbs./100 lbs. of fish oil (0.01 to 0.15:1 steam to oil). Insufficient steam can undesirably lead to polymerization of the oil or at least inadequate stripping of free fatty acids and odoriferous compounds, thus yielding a product which is insufficiently deodorized. Similarly, reversion can occur more rapidly during storage if the undesirable compounds are not stripped away. Lastly, the cholesterol removal is much less efficient. Excessive steam consumption, however, ca lead to much higher operating costs in the form of increased load on the vacuum system and further to incurring avoidable costs due to product loss through carry-over and unnecessary steam consumption. While high steam consumption adds to overall processing costs, steam costs are generally a much smaller cost compared to costs associated with product losses. Of course, the steam introduced to the bottom of the thin-film stripper is also pulled to the condenser or scrubber 24.

The rate at which the oil feed is fed to the thin-film stripping step is also an important independent process variable since the feed rate affects film thickness in the stripper 30. Another important distinguishing aspect of the present process is that the present process is practiced at much lower feed rates than is recommended by the equipment manufacturer. For example, for equipment rated with a throughput capacity of 25–100 lbs./hr., the presently employed feed rates typically range from about 5–8 lbs./hr. Importantly, the feed rates are controlled such that the film thickness ranges from about 1 to 25 mm and preferably about 1 to 5 mm in the thin-film stripper 30. Indeed, while the manufacturer describes the oil as falling in a thin-film, when viewed under the present, essential operating conditions, the oil/steam mixture appears to fall through the apparatus as a "rain" or mist or as very fine droplets. Thus, the present process is practiced at the far extreme end of thin-film stripping.

In addition to film thickness, it is also important that the evaporative surface of the thin-film stripper is maintained at a temperature of at least about 400°, preferably up to 650° F., more preferably about 425° to 600° F., and most preferably about 450° to 550° F. using internal circulation of auxiliary heating media 32 through the stripper's 30 plumbing to provide further indirect heating of the oil for process control.

While not wishing to be bound by the present theory, it is speculated herein by virtue of the present unique thin-film technique, that the number of theoretical plates achieved is dramatically increased and thus mass transfer rates increased so as to effect removal of the non-esterified cholesterol notwithstanding the similarity, broadly speaking, between the operating conditions and residence times of conventional steam stripping deodorization and the present method. Regardless of the theoretical mechanism, the present invention substantially reduces the overall or native cholesterol level in fish oil by up to two-thirds or more while conventional deodorization results in minimal cholesterol removal.

Most surprisingly, the fish oil is also effectively cleaned or deodorized simultaneously with the non-esterified cholesterol removal when processed under the conditions described above. Such a result is highly surprising to those familiar with oil processing and with the present equipment employed. The fish oil realized thus is also characterized by the clean color and flavor of a deodorized fish oil.

Exiting the stripper 30 is a clean oil stream 34, still at a pressure of at least 1 mmHg, preferably 1–7 mmHg, which is then desirably cooled to room temperature in a conventional manner such as first passing through the plate heat exchanger 13 to conserve energy by preheating the oil feed 11 and finally with a cooling means 36 such as a cold water heat exchanger and anaerobically stored, e.g., with a positive pressure of an inert gas 38, preferably nitrogen. Sparge steam may also be optionally applied to the oil during cooling to preserve the highest quality possible. It is important to avoid any contact between fish oil at an elevated temperature and oxygen since oxidation rates are greatly accelerated with higher oil temperatures. Such contact between oxygen and other fats, e.g., dairy oils and fats, beef tallow, etc. is far less of a problem due to lesser degrees of polyunsaturation, however, it is still desirable for these other fats and oils to be cooled under an oxygen free condition. Oxygen free conditions for the final storage of processed dairy and various other fats and oils, unlike the processed fish oil, however, is not essential.

The described process is useful for realizing a finished fish oil 40 which is reduced in cholesterol, which is deodorized and which has a good flavor.

It is another advantage of the present invention that the residence time of the fish oil during processing is much reduced compared to conventional deodorization apparatus and techniques. Manufacturer's recommended processing conditions result in residence times of 15 minutes or higher. The present process, however, results in residence times of five minutes or less. Such reductions in residence times are highly beneficial since the n-3 fatty acids which are the beneficial constituents are also more susceptible to oxidation. Thus, reduced residence times minimize their degradation.

In another preferred embodiment of the present invention depicted in FIG. 1A of the aforementioned and incorporated by reference text of U.S. Pat. No. 4,996,072, however, a conventional deodorization step is added as a finishing step. Such an added deodorization step can be employed when the highest quality, cleanest flavor fish oil is desired, although extra costs are incurred. In this embodiment, the clean oil is subjected to a "second" or conventional deodorization step using conventional deodorization equipment, methods and conditions. Oil deodorization is generally considered to be a fully developed art and one skilled in the art will have no difficulty selecting suitable apparatus and techniques from among those known. Generally, after collecting in a surge/measuring tank 50, the oil 40 is fed to a conventional deodorizer 52. Steam 54 (280° to 360° F., 50 to 150 psia) is introduced at the bottom of each station and withdrawn from the vessel and pulled to a scrubber. Supplemental heating 56 and cooling 58 can be employed. Column operating pressures range from at least about 1 mmHg, preferably 1 to 7 mmHg by pulling a vacuum from a convention vacuum source 60. The oil is not refluxed. A twice deodorized fish oil product is withdrawn from the deodorizer 52. Optionally filtered in filter 64 and pumped to anaerobic storage. Deodorization, however, typically results in some fish oil loss, although such losses are modest, e.g., as low as 1%.

The clean fish oils realized by the present invention are critically characterized in part by removal of substantially all non-esterified cholesterol and thereby also by an overall cholesterol level reduction of at least 50% and even up to 65% or more from the native or overall cholesterol level. While not wishing to be bound by the proposed theory, it is speculated herein that the unremoved or residual cholesterol is more difficult to remove since it exists as cholesterol esters which have higher molecular weights and thus correspondingly lower volatilities. For lard, overall cholesterol reductions of even as high as 90% and higher have been obtained while in butterfat, reductions of up to 95% have been obtained.

In accordance with the invention there is provided a clean fish oil having a cholesterol level of less than 50% of the native level, preferably less than about 60–65% and wherein substantially all (i.e., in excess of 98%) of the non-esterified cholesterol has been removed. Qualitatively, the fish oil is bland and substantially free of fishy flavor to the average taster as measured by conventional sensory evaluation of oils (see, for example, A.O.C.S. Recommended Practice, pgs. 2–83). In contrast to chemical methods of cholesterol removal from deodorized fish oil, the fish oil products of the present invention are substantially free of all organic solvents (i.e., less than 1 ppm). Further, unlike clean fish oil prepared from laboratory scale or molecular distillation, the present oils are importantly characterized by a light color and an absence of a strong chemical flavor.

When other oil feeds are employed, the present invention resides in clean, bland tasting oils characterized by the removal of substantially all non-esterified cholesterol and which nonetheless are free of chemical extractants.

The finished oils of the present invention as described have use as a food ingredient in a wide variety of food applications. In particular, the fish oil can be used to fortify other foods such as fabricated fish or battered and breaded fish portions. The novel fish oils can also be used in full or partial substitution for conventional oils in many food products such as salad dressing, mayonnaise and the like.

Having described the first and second aspects of the invention, the following examples embody the invention:

EXAMPLE 1

A commercially obtained menhaden oil was used as the starting material having iodine value of 186, EPA content of 14.6% DHA content of 11.2%, cholesterol level of 0.470%, and free fatty acid of 0.08%.

A semi-pilot plant oil processing system 10 conforming substantially to FIG. 1 of the aforementioned and incorporated by reference text of U.S. Pat. No. 4,996,072 was utilized to deodorize the above refined fish oil while simultaneously reducing its cholesterol level. The processing system employed a Model No. ESSJ 13-2 Evaporator, steam stripper (available from Artisan Industries, Inc.) as the thin film steam stripping column 30. The processing system was started up by drawing a vacuum on the entire system, heating the pre-evaporator 25 and thin film steam stripping sections 30 using Dowtherm HT, (partially hydrogenated terphenyl) as the heat transfer media, establishing steady state conditions with the stripping steam 15 and 28 in the pre-evaporator 25 and steam stripper sections 30, respectively and charging the system 10 with a continuous feed stream of refined fish oil.

The refined fish oil was first deaerated in a feed tank using a vacuum of 25 mmHg absolute pressure and a subsequent nitrogen sparge. Next the feed was pumped through a back pressure valve 12 at a rate of 5.2 lb/hour (2.36 kg/hr) into the processing system, maintained at 1.5 mmHg pressure, where 0.75 lb/hour (0.34 kg/hr) dry steam 15 (14.4% steam:oil ratio) was sparged in line to form a steam/oil mixture. The mixture was heated in the rising film pre-evaporator section 25, which had 1.96 Ft2 (0.18m2) heating surface area and 550° F. Dowtherm HT circulating in the jacket as heat transfer media 19. The steam/oil mixture achieved a final temperature of about 460°-480° F. at the top of the pre-evaporator 25, while still at 1.5 mmHg pressure.

Next the fish oil/steam mixture flowed into the disengaging chamber or vapor head 16, where the vapor phase was flash vaporized and separated from the liquid phase. The loaded vapor phase 20, consisting primarily of steam with free fatty acids, organic compounds, cholesterol, etc., was drawn to the vacuum system and collected as waste. The liquid phase 22, consisting of par-treated fish oil, was then thin film countercurrent steam stripped in the stripping section 30 which consisted of 13 tube and disc stages which were heated using the Dowtherm HT heat transfer media 32. The oil cascaded over the stages by gravity in a very fine film of a thickness visually measured of about 10 mm, which however in the final stages broke down into a mist of droplets with diameter of 0.2-5 mm. Simultaneously, 0.75 lb/hour (0.34 kg/hr) dry steam (14.4% steam:oil ratio) 28 was injected at the bottom of the column 30 to countercurrently strip the volatile components from the fish oil, such as free fatty acids, cholesterol, etc.

After steam stripping, the oil was immediately cooled to ambient temperature, while still under vacuum, using a small water cooled heat exchanger 36. The fish oil was then collected in nitrogen flushed containers for storage.

The final fish oil product had iodine value 184, EPA content of 14.4%, DHA content of 10.8%, cholesterol level of 0.144%, and free fatty acid of 0.03%. The fish oil processed as per the above had the bland flavor of deodorized edible oil, while maintaining the EPA and DHA omega-3 fatty acid content yet nonetheless was characterized by a significant 69.4% cholesterol level reduction.

EXAMPLE 2

A commercially available Menhaden oil was used as the starting material having iodine value of 186 EPA content of 13.0%, DHA content of 9.9%, cholesterol level of 0.463% and free fatty acid of 0.23%.

A semi-pilot plant apparatus conforming to FIG. 1 of the aforementioned and incorporated by reference text of U.S. Pat. No. 4,996,072 and as used in Example 1 was utilized to deodorize the above refined fish oil while simultaneously reducing its cholesterol level. The process was started up substantially as described in Example 1 by drawing a vacuum on the entire system, heating the pre-evaporator 25 and steam stripper 30 using Dowtherm HT, establishing steady state conditions with the stripping steam 28 in the steam stripper 30 (with none in the evaporator), and charging the system with a continuous feed stream of refined fish oil.

The refined fish oil was first deaerated in a feed tank using a vacuum of 25 mmHg absolute pressure and a subsequent nitrogen flush. Next the feed was pumped through a back pressure valve 12 at a rate of 8.10 lb/hour (3.68 kg/hr) into the processing system, maintained at 2.5 mmHg pressure. No steam was added to the fish oil prior to heating in the pre-evaporator 25 (heating area 1.96 Ft2 or 0.18 m2) as the fish oil was heated to a final temperature of 480°-500° F. at the top of the evaporator using the Dowtherm HT as the media 19 in the jacket.

Next the fish oil passed into and through the vapor head 16 to flash vaporize into a liquid fraction and a vapor fraction. The liquid fraction passed into the stripping section 30 while still at 2.5 mmHg pressure. The par-treated fish oil cascaded over the 13 tube and disc stages, which were heated with 550° F. Dowtherm HT as media 32, in a very fine thin film of a thickness measured at about 10 mm which however in the final stages broke down into a mist of small droplets with diameters of 0.2-5 mm. Simultaneously, 0.75 lb/hour (0.34 kg/hr) dry steam (9.26% steam:oil ratio) 28 was injected at the bottom of the column 30 to countercurrently strip the volatile components from the liquid phase fish oil 22, such as free fatty acids, cholesterol, etc. The vapor phase 20 produced by the flash vaporizing containing the stripping steam and these volatile components, was separated from the liquid phase in the vapor head 16 and drawn to the vacuum system 24, where it was collected as waste.

After the oil was thin film steam stripped, it was immediately cooled to ambient temperature, while still under vacuum, using a small water cooled heat exchanger 36. The fish oil 40 was then collected in nitrogen 38 flushed containers for storage.

The final fish oil product had iodine value 182, EPA content of 12.9%, DHA content of 9.6%, cholesterol level of 0.137%, and free fatty acid of 0.04%. The fish oil processed as per the above had the bland flavor of deodorized edible oil, while maintaining the EPA and DHA omega-3 fatty acid content and had a significant 70.4% reduction in cholesterol level without any steam in the pre-evaporator section.

EXAMPLE 3

Anhydrous butterfat was commercially obtained from Mid America Farms to serve as starting material, having cholesterol level of 0.208% and a free fatty acid level of 0.41%.

A semi-pilot plant apparatus conforming to FIG. 1 of the aforementioned and incorporated by reference text of U.S. Pat. No. 4,996,072 and as used in Examples 1 and 2 was utilized to reduce the cholesterol content of the above butterfat. The process was started up by drawing a vacuum on the entire system, heating the pre-evaporator 25 and steam stripper 30 using Dowtherm HT as media 19 and 32, establishing steady state conditions with the stripping steam 15 and 28 in the pre-evaporator and steam stripper 30, and charging the system with a continuous feed stream of anhydrous butterfat.

The butterfat was first deaerated and preheated to 120° F. in a feed tank using a vacuum of 25 mmHg absolute pressure and a subsequent nitrogen sparge. Next the butterfat feed 14 was pumped through a back pressure valve 12 at a rate of 7.4 lb/hour (3.36 kg/hr) into the processing system 10, maintained at 1.5 mmHg pressure, where 0.720 lb/hour (0.33 kg/hr) dry steam 15 (9.7% steam:fat ratio) was sparged in line to form a steam/fat mixture. The mixture 17 was heated in the rising film pre evaporator 25, which had 1.96 Ft2 heating surface area and 550 F Dowtherm HT circulating in the jacket as media 19. The mixture achieved a final temperature of 470°–490° F. at the top of the pre-evaporator 25, while at 1.5 mmHg absolute pressure.

Next the preheated or par-treated butterfat/steam mixture flowed into the disengaging chamber or vapor head 16, for flash vaporizing, where the liquid phase was separated from the vapor phase. The vapor phase 20, consisting primarily of steam with free fatty acids cholesterol, color bodies, and other volatiles, was drawn to the vacuum system 24 and collected as waste. The liquid phase 22, consisting of par-treated butterfat, was thin film countercurrent steam stripped in the steam stripper 30 consisting of 13 tube and disc stages which were heated using Dowtherm HT. The fat cascaded over the stages by gravity in a very fine film, which broke down in the last stages into a mist of droplets with diameter of 0.2–5 mm. Simultaneously, 0.750 lb/hour (0.33 kg/hr) dry steam 28 (10.1% steam:fat ratio) was injected at the bottom of the stripper column 30 to countercurrently strip the volatile components from the butterfat, such as free fatty acids, cholesterol, color bodies, etc.

After the fat was thin film steam stripped, it was immediately cooled to 130° F. while still under vacuum, using a small water cooled heat exchanger 36. The butterfat was then collected in nitrogen flushed containers for anaerobic storage.

The final butterfat product had cholesterol level 0.010% and free fatty acid of 0.01%. The butterfat 5 processed as per the above had the bland flavor and functionality of commercial butterfat, losing only some color bodies, with a significant 95% reduction in cholesterol level.

EXAMPLE 4

1 part by weight raw egg yolk is mixed together with 2 parts of an extraction oil that has been obtained by subjecting chicken fat to the process of Example 1, whereby the cholesterol content of the chicken fat has been substantially reduced. A wet milling process is used to create an intimate admixture suitable for centrifugation. The wet milling is conducted in an apparatus sold under the trademark, Fryma VK-7 (Fryma-Maschinen AG, CH-4310 Rheinfelden, Switzerland).

EXAMPLE 5

A test tube full of the intimately mixed product of Example 4 is then centrifuged for a period of five minutes to yield two phases, a lower, egg yolk-rich phase that is retained for processing as a foodstuff, and an upper phase to be decanted off, and used for step (c). It is understood that in any commercial operation of the present invention, a conventional, continuous centrifugation process is preferably utilized.

EXAMPLE 6

The second, cholesterol-rich fraction which is decanted off in the procedure of Example 5 is thereafter introduced as the oil feed of cholesterol which is substituted for the oil containing native cholesterol in the process of Example 1. The resultant two phase exit flow comprises a liquid phase containing oil with reduced level of cholesterol and a vapor phase rich in cholesterol. The vapor phase is discarded, while the liquid phase is recycled to be used as extraction oil for said wet milling.

EXAMPLE 7

The lower, egg yolk-rich phase of Example 5 that is retained for processing as a foodstuff may be used in a variety of ways. The egg yolk-rich phase may be substituted without further processing for egg yolk in a commercial operation where egg yolk, per se, is required either for cooking or baking.

Where an egg product is to be made available for sale to consumers it is generally reconstituted together with appropriate amount of egg white to form a whole egg product.

In a preferred embodiment of a reconstituted product, the egg white and the egg yolk-rich phase are mixed together to form a product that is offered to consumers in a "scrambled" form.

Pasteurization is optimally included as a processing step whereby any danger of salmonella or other illness inherent in poultry is obviated. Homogenization is also a desirable processing step.

EXAMPLE 8

Instead of creating a "scrambled" egg form as in Example 7, it is also possible to form an "egg" in an unscrambled form. The egg-yolk rich phase may be extruded in a conventional manner with pieces of the egg-yolk rich phase being cut into units equivalent to an egg yolk, with the resultant "egg yolk" being treated in conventional means for such reconstitution whereby a solid film encasing the "egg yolk" is formed. A plurality of "egg yolks" is then mixed with egg white under conditions not to break the "egg yolks".

EXAMPLE 9

The "scrambled" form of egg of Example 7 has an oil content substantially equivalent to that of a regular, untreated egg. Whereas the cholesterol component of the oil has been removed in accordance with the process leading to the egg of Example 7, a small amount of oil substantially equivalent to the removed cholesterol is retained. In a preferred embodiment, chicken fat is used as the extraction oil.

EXAMPLE 10

Instead of providing the replacement oil from the extraction oil in the same amount as the removed cholesterol as in Example 10, it is possible to include an excess oil of up to about five percent, and preferably not more than about three percent. In this example, the amount of oil in the "scrambled" egg of the invention of Example 7 is increased by one percent. Inclusion of an increased amount of oil facilitates making a scrambled fried egg food product.

Having described the invention, the claims define the scope of protection:

What is claimed is:

1. A method for reducing the cholesterol level of an oil feed comprising introducing an oil feed having an elevated cholesterol level in comparison to a desired cholesterol level at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol.

2. A method of claim 1 wherein said method is operated under conditions to remove at least fifty percent of the cholesterol from said oil feed.

3. A method of claim 1 wherein said feed oil is a fish oil, animal fat or oil, marine fat or oil, dairy fat or oil.

4. A method of claim 1 wherein at least 65% of the cholesterol is removed from said feed oil.

5. The process of claim 1 wherein said feed oil is a dairy fat or oil.

6. The process of claim 1 wherein said feed oil is a dairy fat or oil which is anhydrous butterfat.

7. The process of claim 1 wherein said feed oil is an animal fat.

8. A process of claim 7 wherein said animal fat is chicken fat.

9. A process for the continuous removal of cholesterol from a feed oil which comprises (a) wet milling a raw oil having an elevated cholesterol level with an extraction oil whereby there is formed a mixture of the raw oil and extraction oil; (b) centrifuging said mixture to yield a first fraction low in cholesterol, said first fraction being suited for incorporation into a foodstuff, and a second fraction which is an oil feed having a high level of cholesterol; (c) introducing said oil feed at a temperature of at least about 400° F. at an upper portion of a countercurrent thin-film steam stripper while simultaneously introducing steam at a lower portion thereof, wherein said countercurrent thin film steam stripper is internally configured with sufficient active surface area so that it is capable under appropriate operating flow conditions of temperature, pressure and steam flow rates to remove at least 65% cholesterol from a cholesterol containing oil, said countercurrent thin-film steam stripper being continuously maintained at a pressure of at least about 1 mmHg and a temperature of at least about 400° F., whereby there is produced a two phase exit flow therefrom comprising a liquid phase containing oil with reduced level of cholesterol and a vapor phase rich in cholesterol; (d) and recycling said liquid phase as an extraction oil for said wet milling.

10. A process of claim 9 wherein said first fraction is incorporated into a foodstuff.

11. A process of claim 9 wherein said raw oil is wet egg yolk, whereby there is produced said first fraction which is a lowered cholesterol component of egg yolk.

12. A process of claim 9 wherein said method is operated under conditions to remove at least fifty percent of the cholesterol from said oil feed.

13. A process of claim 9 wherein a vegetable oil is included in said wet milling and forms a component of the recycled oil and the feed oil.

14. A process of claim 9 wherein at least 65% of the cholesterol is removed from said feed oil.

15. A process of claim 9 wherein an animal oil is included in said wet milling and forms a component of the recycled oil and the feed oil.

16. A process of claim 9 wherein said animal oil is chicken fat.

* * * * *